(12) United States Patent
Arning et al.

(10) Patent No.: US 7,660,855 B2
(45) Date of Patent: Feb. 9, 2010

(54) USING A PREDICTION ALGORITHM ON THE ADDRESSEE FIELD IN ELECTRONIC MAIL SYSTEMS

(75) Inventors: Andreas Arning, Rottenburg (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 10/670,638

(22) Filed: Sep. 24, 2003

(65) Prior Publication Data

US 2004/0215726 A1    Oct. 28, 2004

(30) Foreign Application Priority Data

Sep. 24, 2002  (EP)  ................................ 02021152

(51) Int. Cl.
*G06F 17/21*  (2006.01)
*G06F 15/16*  (2006.01)

(52) U.S. Cl. ............... 709/206; 709/207; 709/225; 709/227; 709/203; 707/6; 704/8; 704/3; 704/10

(58) Field of Classification Search .............. 709/203, 709/207, 206, 225, 227
See application file for complete search history.

(56) References Cited

U.S. PATENT DOCUMENTS

| 6,005,928 | A  | * | 12/1999 | Johnson | ................ | 379/142.01 |
| 6,684,238 | B1 | * | 1/2004  | Dutta   | ................ | 709/206 |
| 2002/0165932 | A1 | * | 11/2002 | Rensin et al. | ............ | 709/217 |
| 2003/0115279 | A1 | * | 6/2003  | Quine et al. | ............. | 709/207 |

* cited by examiner

*Primary Examiner*—Jude J. Jean-Gilles
(74) *Attorney, Agent, or Firm*—Steven M. Greenberg, Esq.; Joseph E. Bracken, Esq.; Carey, Rodriguez, Greenberg & Paul, LLP

(57) ABSTRACT

A computerized method for predicting/completing the addressee field in an electronic mail system, in which user-related history information, including the user's sent and/or received mail, is analyzed, using text mining and/or data mining techniques, for associating the most probable addressee for a given e-mail letter.

33 Claims, 2 Drawing Sheets

210: SUBJECT LINE TOPIC %

215 SALUTATION, CLOSING FORMAL %

220: LANGUAGE FORMAL %

230: LANGUAGE ENGLISH %

240: CONFIDENTIAL YES %

250: TOPICS IN TEXT BODY

POLITICS %
SPORTS %
ECONOMY %
PROJECT 1: SALE OF PRODUCT X %
PROJECT 2: MANAGEMENT OF CONGRESS X %
PROJECT 3: SALE OF PRODUCT Y %
PROJECT 4: TEST OF PRODUCT Z %

FIG. 2

USING A PREDICTION ALGORITHM ON THE ADDRESSEE FIELD IN ELECTRONIC MAIL SYSTEMS

BACKGROUND OF THE INVENTION

1. Field of the Invention

The present invention relates to the field of computer technology, and in particular to a computerized method for predicting the addressee field in an electronic mail system, in which history information associated with the user's sent mail is analyzed for the purpose of associating the most probable addressee for a given e-mail letter.

2. Description of the Related Art

When using electronic mail (e-mail), a user normally must use the addressee's complete electronic address, referred to herein as a TCP-IP address. The user is typically required to use the TCP-IP address in a correct form, because this address is used to route the mail to the intended target mail server. Usually, there is an IP-address of the mail server encoded within the TCP-IP address. The TCP-IP address further includes user-specific ID-information (e.g., the name or nickname of the addressee) so as to distinguish one particular addressee from among a plurality of users registered with the target mail server.

Usually, the TCP-IP-address information itself is not actually entered by the user, but instead, a more readable character string is used. For example, the character string that comprises the TCP-IP address can be converted by the personal e-mail client program into the complete name of a respective person, e.g., "David Miller" might be used and displayed to the user instead of the TCP-IP address "Miller-David@companyX.de".

This additional information concerning location, organization and/or country is usually added to the user name to make it unique. Sometimes, even a number may be added to the name to generate a unique mail system address.

State of the art e-mail client programs installed at the user's PC do not propose or predict an addressee term, i.e. the addressee's e-mail address, when a new mail is created. Once, however, the user begins to enter some characters into the addressee field in the 'new message' window of his e-mail client, some programs will attempt to complete the name based on this initial entry of characters. This is true, for example, for newer versions of Microsoft™ Outlook Express™. A similar procedure is used in Microsoft™ Internet Explorer, Version 6 and many other programs, which append the rest of a stored character string to the initial string entered by a user. A disadvantage of this automatic string-completion is that it requires an initial user action to identify a significant subset of addressees, which are selected from a personal address book stored locally at the user PC, and/or stored in a centralized form at the e-mail server in an intranet or LAN of an enterprise.

If the user creating a new e-mail does not enter anything into the addressee field, prior art techniques disadvantageously do not make any proposal with regard to whom the mail could be addressed, even if the header/subject line is already filled-in by the user, and/or the text of the mail already comprises a considerable number of pages.

If some initial entry, e.g., at least one character, is present in the addressee field, a prior art e-mail program, for example the e-mail client in Lotus Notes™, Release 5, performs the above-mentioned address prediction based on stored addresses at the mail server of an Intranet, but to do that, the user's PC must be connected to the LAN, or to the Intranet, respectively. If the user's PC is cut off from such network, only the locally stored address book may be used for addressee term proposals.

Thus, where access to the complete list of electronic mail addressees is available, i.e., in a "closed world" scenario, where basically all mail addresses are known and can be listed or accessed, a prior art e-mail client may do one of the following solutions when confronted with an incomplete or ambiguous mail address entry:

1. it may reject such incomplete or ambiguous mail address;
2. it may replace an incomplete, but unique name in the mail address field on demand or automatically by the complete, unique mail address, or
3. it may map an incomplete and ambiguous mail address to a complete unique mail address and make a respective proposal, in the event that more than one complete, unique mail address matches. In prior art systems, usually some heuristic methods are used to rank the list of candidates and then the top-candidate is used as the best replacement for the incomplete and ambiguous mail address. These heuristic methods comprise, for example, a comparison of dates of stored e-mail correspondence, or the number of e-mails sent to each respective candidate, whereby the candidate who has the most contacts is proposed as the most likely recipient. Thus, some meta data stored in the history of the user is evaluated in prior art method in order to give the best possible addressee prediction.

Such predictive methods, however, result in unsatisfactory proposals which, in many cases, are nonsensical and may result in misrouted electronic mail.

OBJECTIVES OF THE INVENTION

It is thus an objective of the present invention to improve the prediction accuracy of auto-fill email addressing.

SUMMARY OF THE INVENTION

The present invention combines prior art Text Mining methods, such as those methods commercially available in the IBM™ product "DB2 Intelligent Miner for Text", and prior art Data Mining methods, such as those methods commercially available in the IBM™ product "DB2—Intelligent Mining for Data" (both products being available at each IBM business partner and publicly available at http://www.ibm.com/software/data/iminer/) to automatically determine the most likely addressee in a new e-mail drafted by a user. Prior art Text Mining methods are applied to a set of attributes which are characteristic for e-mail correspondence in order to generate intermediate results in a particular form, preferably in a table-based form, which may be further processed by prior art Data Mining methods. Model generation and training is done once, and then repeated at predetermined intervals, or when it seems appropriate. The application of the generated and trained models is preferably done on-the-fly and transparent to the user, whenever the entry of an addressee is needed. Further training may occur at a place different than the location of the application, and may be undertaken by different enterprises.

According to one aspect of the present invention (a training mode), a computerized method is disclosed for predicting the correct addressee to be filled-in in an addressee field in a personal electronic mail system, by which user-related history information, including the user's sent and/or received mail, is analyzed for associating the most probable addressee for a given e-mail letter. The inventive method of the embodiment is characterized by the steps of:

a) analyzing the contents of at least a subset of the following attributes for both the newly-composed mail and historical mail:

aa) the subject line;
bb) the length of the e-mail letter or draft;
cc) the language in use;
dd) the time of day;
ee) the vocabulary in use;
ff) the topics discussed in the body;
gg) the salutation form;
hh) the closing form;

whereby Text Mining methods are used where appropriate to associate attribute values with respective addressees, thus yielding a plurality of single-analysis results usable for said prediction; and b) weighting the plurality of single-analysis results to provide a Data Mining Model adapted to offer at least one top favorite addressee proposal as a prediction result.

It should be noted that when using the received-mail history information, the information from the sender field should be used instead of the addressee field (which is used when using the sent-mail history information). Of course, each information source may be used separately, or they may be used in combination.

Further advantageous embodiments and improvements will be apparent from the descriptions and appended claims.

BRIEF DESCRIPTION OF THE DRAWINGS

The present invention is illustrated by way of example and is not limited by the illustrations of the drawings in which:

FIG. 2 is a schematic block diagram of text mining results used according to the invention.

DETAILED DESCRIPTION OF THE PREFERRED EMBODIMENTS

Figure 1:
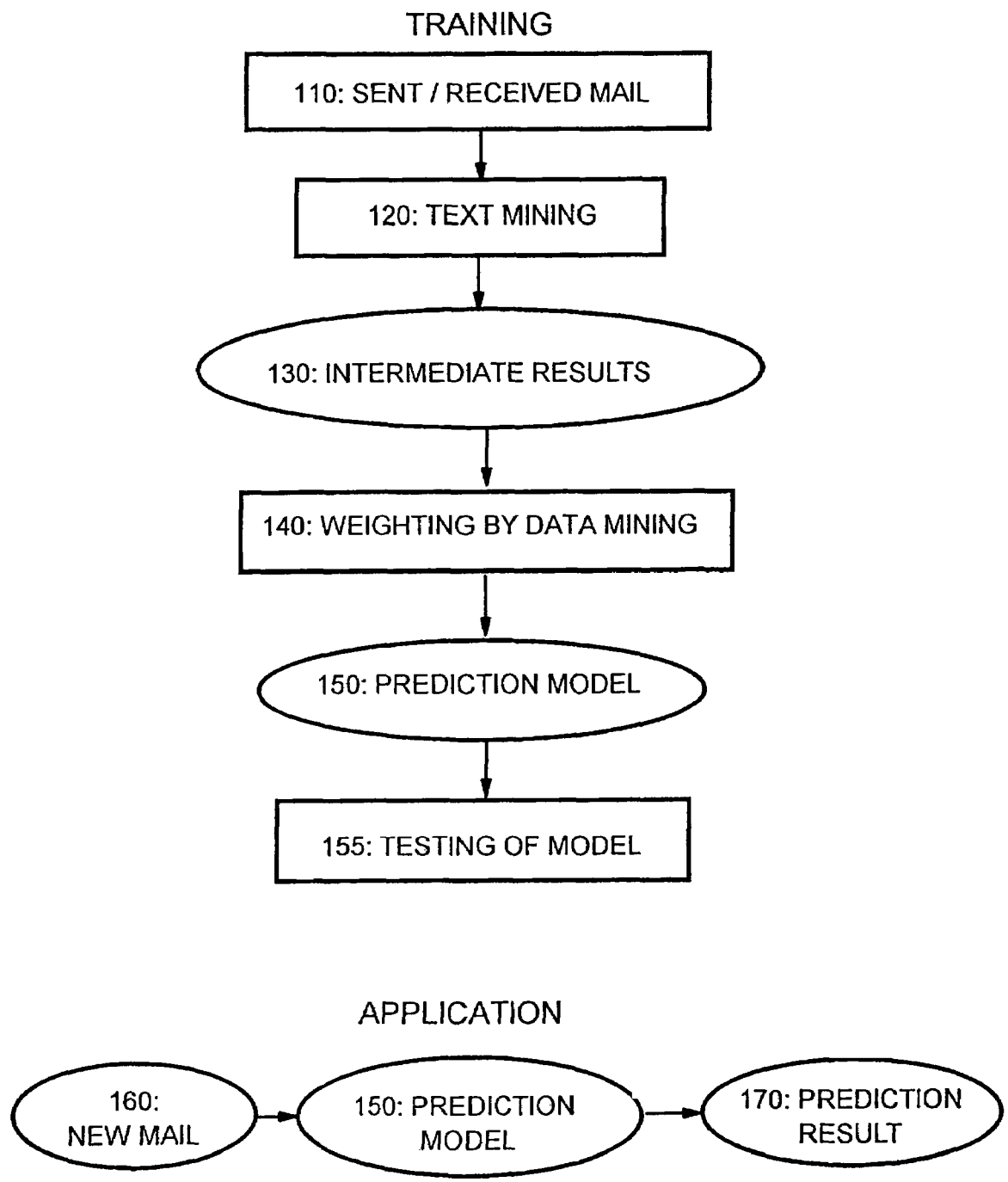
FIG. 1 is a schematic block diagram showing the basic control flow during generation and training of the prediction models, and during application of said models.

With general reference to the figures and with specific reference now to FIG. 1, the basic control flow of the training for the prediction models will be described in more detail.

At step 110 an inventive program module, which may be incorporated in a personal e-mail client local to the user, or, alternatively in a centralized form at the mail server/firewall, accesses the sent mail and the received mail of a particular user. This "history data" is now subjected, according to the present invention, to prior art Text Mining methodology, at step 120. Specifically, a major subset of the history data is used as a training set for predicting the one or more addressees of a mail by exploiting the features, which are specific for e-mail applications, such as the following attributes:

The subject line, the salutation and closing sequences, the language or vocabulary in use, and the topics, which are discussed in the body of each e-mail, and optionally any time information available, either in the plain text of the body, or available as meta data in the e-mail client program, and optionally the lengths of the mail. The product of this text mining process is stored as intermediate results (step 130).

The structure of data, which is used for analyzing the above-mentioned attributes (subject line, etc.) may be selected in any manner, but preferably in a form which maximizes its efficient use in the succeeding step (step 140) of processing by a Data Mining method. A preferred data structure to accomplish this is illustrated by way of example in FIG. 2.

Returning to FIG. 1, at step 140 the intermediate results resulting from step 130, whereby each result describes some association between a respective single e-mail and one or more particular addressee candidates thereof, is subjected according to the present invention to a further more specific analysis, in order to filter out the less important and less significant attributes which are not very useful when applied for prediction purposes.

According to a basic principle of the present invention and of the preferred embodiment, this further analysis at step 140 comprises the use of known Data Mining based methods. The result thereof is a trained prediction model (step 150), which is able to associate a given new e-mail to be created with a small set of potential addressees. The resulting association forms a list of "top candidates" (e.g., one or two top candidates) that have a high probability of being the correct e-mail address desired by the author of the e-mail. The list may be generated by the inventive program module and may be issued to the user for selecting the correct addressee, for instance in case three or four addressees are proposed.

In a further, optional step the trained models created at step 150 may be subjected to a test phase (step 155), as this is a common procedure in prior art model build-and-test arrangements. A separate test set of history data, which is preferably unique (has no shared elements) to the training set, is used to predict the addressee, and the system's prediction is compared with the actual addressee. If the rate of correctly predicted addressees is high enough, for instance a success rate of 90%, the trained models created at step 150 may be used for prediction to be applied for newly created e-mails; thus, some prediction result will be obtained (step 170), whenever a user starts writing the plain text of a new e-mail letter, even if the user did not fill in any character string into the addressee field.

Once the model is created and optionally tested during the test step 155, the model 150 may be used in its application mode to do one or more of the following:

A first task is to automatically propose an addressee for an e-mail draft (step 160), which is already written and in which the addressee field is still empty. Thus, an e-mail draft (step 160) is applied to the prediction model (step 150), resulting in a prediction result (step 170). This may cause the addressee field to be pre-filled. If the prediction method in use is able to return a confidence value for a prediction, this confidence value may be compared to a threshold and thus help to suppress insignificant predictions. Such threshold levels may be predetermined to comprise several different values dependent upon their use. For example, in private use the thresholds may be lower and in business use they may be higher in order to reflect a higher level of scrutiny which may be necessary in business practice.

Further, the prediction result achieved at step 170 may be used to automatically expand ambiguous addressee information according to the best match. This is done preferably by giving a "highest priority" designation to the candidate having the highest confidence value. In an online mode in the case of a "closed world" scenario, as described above, this addressee term expansion may be visible as a list, from which the user may select a name. In an offline mode, the result achieved at step 170 may also (or instead) be used to improve the current address resolution to avoid sending an e-mail to a non-intended addressee.

Further, the prediction result achieved at step 170 may be used for a cross-check between the proposed addressee and the addressee entered manually by the user, in order to raise, i.e. issue a warning, if a predicted addressee is not on the addressee list, and/or if a not-predicted addressee is on the list. If the prediction method used is able to return a confidence value, this value can be compared to appropriately selected threshold values, in order to determine, whether either of the above warnings (1. predicted, but not on addressee-list, 2. on addressee-list, but not predicted) should be raised.

With reference now to FIG. 2, a sample set of attributes is described along with data structure used in the inventive context, in connection with a Data Mining method. The data structures given in FIG. 2 is used for the purposes of example only and is simplified for the purpose of explanation. They result from the Text Mining method (step 120 of FIG. 1). The set of attributes developed by the intermediate Text Mining result (step 130 of FIG. 1) may have a table-like form as depicted in FIG. 2 and may comprise a plurality of attributes each accompanied by a confidence value, for example, values expressed as a percentage.

In a preferred embodiment, the following attributes are evaluated according to the present invention:

The subject line showing some header topic 210, which gives the reference (RE) information, may be analysed by Text Mining, to retrieve similarities between different topics present in the training data.

Further, the salutation and/or closing attributes 215 may be analyzed, for example, to determine the degree to which they are more, or less, formal. The salutation "Hello Joe" could be associated as a formal salutation for instance, with a confidence value of only 5%, whereas a salutation "Dear Sirs" could be assessed as a formal salutation with a confidence value of nearly 100%. Similar rules could apply for intermediate degrees, e.g., for cases such as "Hello Mr. Miller" etc.

In the same way the language style attributes (language formality 220), i.e., the vocabulary used in the body of the e-mail, may be analyzed as being more or less formal. Slang-type wordings could contribute to a language classification of "informal", whereas the absence of such slang could generate a confidence value of high degree that the language of the e-mail corresponds to a formal style of language.

Further, in accordance with the present invention, the language may be analyzed by Text Mining methods, in order to reveal a confidence value for a predetermined selection of languages. In FIG. 2 only one language 230 (English) is depicted. It is understood, however, that for each language of this selection a respective confidence value may be generated. When the text only comprises German words, for example, the confidence value of German would be 100%. In a mixed-language case the confidence value may vary according to the proportion of the respective different languages words. In this case, a subset of languages 230, for example ten different languages, may be used in connection with the Text Mining methods.

According to the invention, a further attribute for evaluation is the confidentiality 240 of an e-mail. According to the invention, an existing e-mail may be identified as confidential, if one or more of predetermined keywords (e.g., "confidential") exist either in the subject line, or in the body of the text. Further, other meta information may be used to assess a mail as confidential. For example, if the mail has an attachment in an encoded form, the message can be identified as being confidential.

Further, topics 25 [250?] in the text body may be associated with one or more predetermined categories, examples of which are shown in FIG. 2, such as politics, sports, economy, project 1, sale of product x, project 2, management of congress x, project 3, sale of product y, project 4, test of product z.

Each of those topics is again accompanied by a percentage field which is provided to store the confidence value calculated by the applied text mining method. Thus, a given e-mail may achieve a score of 30% politics, 20% sports and 50% sale of product x (which corresponds to project 1). The Text Mining techniques used to perform this analysis corresponds to prior art methods.

The method of the present invention may be implemented in a way which provides one prediction model per user, i.e., end model is unique to each user. This approach may, of course, be varied because there may be cases where a group of users may wish to share the same prediction model, as they share the same contacts. This helps to simplify and standardize the prediction. Further, the method of the present invention may be implemented to cover the usually prevailing three different types of addressee lists, as are "to", "cc:", and "bcc". It may be used to either list separately, and/or in common, lists of likely addresses to be used in these fields.

When using separate Data Mining models for different use modes, e.g., office/private mode of user activities, German/English language used in the mail, Confidential/Not Confidential mail, etc., the underlying models may be selectively trained and prediction quality may be increased.

The same advantage may be obtained when performing a retraining of the user-specific Data Mining model triggered by either of the following criteria:

a) when a user overwrites the addressee proposals made by the e-mail system, more frequently than limited by a predefined threshold level, b) when the e-mail system is confronted with a number of new addressees, which do not form part of the user's history, and the number or fraction thereof is higher than a predefined threshold level, c) after a predefined time limit has passed.

Thus, the underlying prediction model is always up-to-date.

When said analysis results are generated in a table-like form, in which each attribute to be analyzed is associated to its predicted value, accompanied by a respective confidence value, then a preferable output form is obtained, which is best worked on subsequently by prior art Data Mining tools, if they are used within the inventive method.

According to another aspect of the present invention (an application mode), a computerized method for completing the addressee field in a user-initiated "new mail" within an electronic mail system is disclosed, which is characterized by the steps of:

a) on occurrence of an incomplete entering of the addressee term in an addressee field, running a predictive Data Mining method based on the trained Data Mining Model as mentioned above, b) determining at least the most probable addressee to the user as a prediction result.

Another embodiment comprises the further step of offering a subset of a predefined quantity of top favorite addressee proposals to the user, and a respective plurality of similarly assessed top favorites may be proposed to the user to allow selection of the correct single address, or to select further addressees for cc—(copy) or bcc—(blind copy) lists.

The present invention functions particularly well when automatically providing an addressee field pre-filled with the top favorite addressee, where a single proposed favorite has a significantly higher ranking result than the other proposed favorites.

When testing the Data Mining model on a test set of mails, not being part of the training step, before predicting the most probable addressee, and issuing a hint to the user, indicating the confidence of the predicted addressee proposal, for instance in form of a confidence value, the user is given additional security for the correct addressee selection, which may save time otherwise needed for a confirmatory check of the personal or Intranet-wide address book.

When further, in case of a trunk of the addressee term being present in the addressee field, e.g., due to manual entering, and in case a high significance of the predictable addressee being present provided by the run of the Data Mining method, said trunk may be automatically expanded with the most probable addressee term. This also contributes to increased user comfort.

When finally, cross-checking a term entered manually by the user with a list of top favorite addressees, determined by the inventive system, and issuing a warning, if the probability is high that the user-entered term is faulty, then an additional contribution is provided to avoid misrouted mails.

In addition to being useable for determining the most probable addressee of a newly-drafted e-mail, the concepts of the present invention can also be applied for determining, for example, if such e-mail letter should be sent as "CONFIDENTIAL INFORMATION" or not, thus implying the need to use appropriate encoding techniques, or not. For this purpose, a training phase can be run to create a model which helps to decide if a document is confidential or not. For instance, such training may generate a predetermined list of keywords, and the letter draft is scanned for such words, for example during the Text Mining processing of "topics", as described above. If one or more of such keywords occur, the user can be alerted that the mail should be sent according to the rules usually applied for confidential information.

The present invention can be realized in hardware, software, or a combination of hardware and software. A prediction tool according to the present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A computerized method for predicting a correct addressee to be filled-in in an addressee field in an e-mail computer hardware system, whereby user-related history information, including the user's prior sent and/or received e-mail, is analyzed for associating the most probable addressee for an e-mail to be addressed, comprising the steps of:

analyzing, within the e-mail computer hardware system, at least one of the following attributes of said user-related history information and of said e-mail to be addressed:
a subject line of said sent, received, and to-be-addressed e-mail;
the length of said sent, received, and to-be-addressed e-mail;
the language used in said sent, received, and to-be-addressed e-mail;
a time associated with said sent, received, and to-be-addressed e-mail;
the vocabulary used in said sent, received, and to-be-addressed e-mail;
topics discussed in the body of said sent, received, and to-be-addressed e-mail;
the salutation form used in said sent, received, and to-be-addressed e-mail;
the closing form used in said sent, received, and to-be-addressed e-mail;
whereby Text Mining methods are used to associate attribute values with respective addressees, thus yielding a plurality of single analysis results usable for said prediction, and
weighting the plurality of said single analysis results to provide a Data Mining Model adapted to offer at least one top favorite addressee proposal as a prediction result.

2. The method according to claim 1, wherein said e-mail system has multiple use modes, further comprising the step of:
using separate Data Mining models for different use modes.

3. The method according to claim 1, further comprising the step of: performing a training of the Data Mining model triggered by any of the following criteria:
when a user overwrites the addressee proposal(s) made by the e-mail system, more frequently than limited by a predefined threshold level;
when the e-mail system is confronted with a number of new addressees not found in the user-related history information, and the number or fraction thereof is higher than a predefined threshold level;
after a predefined time limit has passed.

4. The method according to claim 1, in which the analysis results are generated in a table-like form, in which each attribute to be analyzed is associated with a predicted value, accompanied by a respective confidence value.

5. A computerized method for completing an addressee field in a user-initiated "new mail" within an e-mail computer hardware system, comprising the steps of:
on an occurrence of an incomplete entering of an addressee term in said addressee field, running a predictive Data Mining method based on a trained Data Mining Model developed by:
analyzing, within the e-mail computer hardware system, one or more attribute values of user-related history information, including the user's prior sent and/or received e-mail, and of said new e-mail to be addressed, whereby Text Mining methods are used to associate attribute values with respective addressees, thus yielding a plurality of single analysis results usable for said completing the address field; and
weighting the plurality of single analysis results to provide a Data Mining Model adapted to offer at least one top favorite addressee proposal as an address-completion result; and
conveying at least the most probable addressee proposal to the user as an address-completion result.

6. The method of claim 5, wherein said analyzing step includes at least the step of analyzing one or more of the following attribute values of said user-related history:
- a subject line of sent, received, and/or to-be-addressed e-mail;
- the length of said sent, received, and/or to-be-addressed e-mail;
- the language used in said sent, received, and/or to-be-addressed e-mail;
- a time associated with said sent, received, and/or to-be-addressed e-mail;
- the vocabulary used in said sent, received, and/or to-be-addressed e-mail;
- topics discussed in the body of said sent, received, and/or to-be-addressed e-mail;
- the salutation form used in said sent, received, and/or to-be-addressed e-mail; and
- the closing form used in said sent, received, and/or to-be-addressed e-mail.

7. The method according to claim 5, further comprising the step of:
- offering a subset of a predefined quantity of top favorite addressee proposals to the user for selection.

8. The method according to claim 5, further comprising the step of
- automatically providing an addressee field pre-filled with a top favorite addressee term.

9. The method according to claim 5, further comprising the step of
- testing the Data Mining model on a test set of e-mail, said test set not being used in the attribute-value analyzing step, before predicting the most probable addressee, and issuing a hint to the user, indicating the confidence of the predicted addressee proposal.

10. The method according to claim 5, further comprising the step of:
- automatically expanding a trunk of an address term with the most probable addressee term, when the trunk of the most probable addressee term is present in the addressee field.

11. The method according to claim 5, further comprising the step of:
- cross-checking an addressee term entered by the user with a list of top favorite addressees, determined by the system, and issuing a warning, if the probability is high that the user-entered addressee term is faulty.

12. A computerized system for predicting a correct addressee to be filled-in in an addressee field in an e-mail system, whereby user-related history information, including the user's prior sent and/or received e-mail, is analyzed for associating the most probable addressee for an e-mail to be addressed, comprising:
- computerized means for analyzing at least one of the following attributes of said user-related history (information and of said e-mail to be addressed:
  - a subject line of sent, received, and/or to-be-addressed e-mail;
  - the length of said sent, received, and/or to-be-addressed e-mail;
  - the language used in said sent, received, and/or to-be-addressed e-mail;
  - a time associated with said sent, received, and/or to-be-addressed e-mail;
  - the vocabulary used in said sent, received, and/or to-be-addressed e-mail;
  - topics discussed in the body of said sent, received, and/or to-be-addressed e-mail;
  - the salutation form used in said sent, received, and/or to-be-addressed e-mail;
  - the closing form used in said sent, received, and/or to-be-addressed e-mail;
- whereby Text Mining methods are used to associate attribute values with respective addressees thus yielding a plurality of single analysis results usable for said prediction,
- computerized means for weighting the plurality of said single analysis results to provide a Data Mining Model adapted to offer at least one top favorite addressee proposal as a prediction result.

13. The system according to claim 12, wherein said e-mail system has multiple use modes, further comprising:
- means for using separate Data Mining models for different use modes.

14. The system according to claim 12, further comprising:
- means for performing a retraining of the Data Mining model triggered by any of the following criteria:
  - when a user overwrites the addressee proposal(s) made by the e-mail system, more frequently than limited by a predefined threshold level;
  - when the e-mail system is confronted with a number of new addressees not found in the user-related history information, and the number or fraction thereof is higher than a predefined threshold level;
- after a predefined time limit has passed.

15. The system according to claim 12, in which the analysis results are generated in a table-like form, in which each attribute to be analyzed is associated with a predicted value, accompanied by a respective confidence value.

16. A computerized system for completing an addressee field of a new e-mail being sent by a user via an e-mail system, comprising:
- computerized means for developing a trained Data Mining Model, comprising
  - computerized means for analyzing one or more attribute values of user-related history information, including the user's prior sent and/or received e-mail, and of said new e-mail whereby Text Mining methods are used to associate attribute values with respective addressees, thus yielding a plurality of single analysis results usable for completing the address field of said new e-mail, and
  - computerized means for weighting the plurality of single analysis results to provide a Data Mining Model adapted to identify at least the most probable addressee proposal from among the plurality of single analysis results as an address-completion result; and
- computerized means for conveying at least the most probable addressee proposal to the user as a proposed address-completion result;
- whereby, on an occurrence of an incomplete entering of an addressee term in said addressee field, running said predictive Data Mining model to identify the most probable addressee proposal.

17. The system of claim 16, wherein said means for analyzing includes at least means for analyzing one or more of the following attribute values of said user-related history:
- a subject line of sent, received, and/or said new e-mail;
- the length of said sent, received, and/or new e-mail;
- the language used in said sent, received, and/or new e-mail;
- a time associated with said sent, received, and/or new e-mail;
- the vocabulary used in said sent, received, and/or new e-mail;
- topics discussed in the body of said sent, received, and/or new e-mail;

the salutation form used in said sent, received, and/or new e-mail; and the closing form used in said sent, received, and/or new e-mail.

18. The system according to claim 16, further comprising:
means for presenting a subset of said single analysis results to said user, said subset comprising the most predefined quantity of top favorite addressee proposals to the user.

19. The system according to claim 16, further comprising means for automatically providing an addressee field pre-filled with the top favorite addressee.

20. The system according to claim 16, further comprising:
means for testing the Data Mining model on a test set of mails, not being part of the training step before predicting the most probable addressee, and means for issuing a hint to the user, indicating the confidence of the predicted addressee proposal.

21. The system according to claim 16, further comprising:
in case of a trunk of the addressee term being present in the addressee field, and in case a high significance of the predictable addressee being present provided by the run of the Data Mining method, means for automatically expanding said trunk with the most probable addressee term.

22. The system according to claim 16, further comprising:
means for cross-checking a term entered by the user with a list of top favorite addressees, determined by the system, and issuing a warning, if the probability is high that the user-entered term is faulty.

23. A computer program product for predicting a correct addressee to be filled-in in an addressee field in an e-mail system, whereby user-related history information, including the user's prior sent and/or received e-mail, is analyzed for associating the most probable addressee for an e-mail to be addressed, the computer program product comprising a computer-readable storage medium having computer-readable program code embodied in the medium, the computer-readable program code comprising:

computer-readable program code that analyzes at least one of the following attributes of said user-related history information and of said e-mail to be addressed:
a subject line of a sent, received, and/or to-be-addressed e-mail;
the length of said sent, received, and/or to-be-addressed e-mail;
the language used in said sent, received, and/or to-be-addressed e-mail;
a time associated with said sent, received, and/or to-be-addressed e-mail;
the vocabulary used in said sent, received, and/or to-be-addressed e-mail;
topics discussed in the body of said sent, received, and/or to-be-addressed e-mail;
the salutation form used in said sent, received, and/or to-be-addressed e-mail;
the closing form used in said sent, received, and/or to-be-addressed e-mail;

whereby Text Mining methods are used to associate attribute values with respective addressees thus yielding a plurality of single analysis results usable for said prediction, and computer-readable program code that weights the plurality of said single analysis results to provide a Data Mining Model adapted to offer at least one top favorite addressee proposal as a prediction result.

24. The computer program product according to claim 23, wherein said e-mail system has multiple use modes, further comprising:

computer-readable program code that uses separate Data Mining models for different use modes.

25. The computer program product according to claim 23, further comprising:

computer-readable program code that performs a retraining of the Data Mining model triggered by any of the following criteria:
when a user overwrites the addressee proposal(s) made by the e-mail system, more frequently than limited by a predefined threshold level;
when the e-mail system is confronted with a number of new addressees not found in the user-related history information, and the number or fraction thereof is higher than a predefined threshold level;
after a predefined time limit has passed.

26. The computer program product according to claim 23, in which the analysis results are generated in a table-like form, in which each attribute to be analyzed is associated with a predicted value, accompanied by a respective confidence value.

27. A computer program product for completing an addressee field in a user-initiated e-mail to be addressed within an e-mail system, the computer program product comprising a computer-readable storage medium having computer-readable program code embodied in the medium, the computer-readable program code comprising:

computer-readable program code that, on an occurrence of an incomplete entering of an addressee term in said addressee field, runs a predictive Data Mining method based on a trained Data Mining Model developed by:
analyzing one or more attribute values of user-related history information, including the user's prior sent and/or receive e-mail, and of said new e-mail to be addressed,
whereby Text Mining methods are used to associate attribute values with respective addressees, thus yielding a plurality of single analysis results usable for said completing the address field, and
weighting the plurality of single analysis results to provide a Data Mining Model adapted to offer at least one top favorite addressee proposal as an address-completion result; and computer-readable program code that conveys at least the most probable addressee proposal to the user as an address-completion result.

28. The computer program product of claim 27, wherein said computer-readable program code that analyzes includes at least computer-readable program code that analyzes one or more of the following attribute values of said user-related history:
a subject line of a sent, received, and/or to-be-addressed e-mail;
the length of said sent, received, and/or to-be-addressed e-mail;
the language used in said sent, received, and/or to-be-addressed e-mail;
a time associated with said sent, received, and/or to-be-addressed e-mail;
the vocabulary used in said sent, received, and/or to-be-addressed e-mail;
topics discussed in the body of said sent, received, and/or to-be-addressed e-mail;
the salutation form used in said sent, received, and/or to-be-addressed e-mail; and
the closing form used in said sent, received, and/or to-be-addressed e-mail.

29. The computer program product according to claim 27, further comprising:

computer-readable program code that offers a subset of predefined quantity of top favorite addressee proposals to the user.

30. The computer program product according to claim 27, further comprising computer-readable program code that automatically provides an addressee field pre-filled with the top favorite addressee.

31. The computer program product according to claim 27, further comprising:

computer-readable program code that tests the Data Mining model on a test set of mails, not being part of the training step before predicting the most probable addressee, and computer-readable program code that issues a hint to the user, indicating the confidence of the predicted addressee proposal.

32. The computer program product according to claim 27, further comprising:

in case of a trunk of the addressee term being present in the addressee field, and in case a high significance of the predictable addressee being present provided by the run of the Data Mining method, computer-readable program code that automatically expands said trunk with the most probable addressee term.

33. The computer program product according to claim 27, further comprising:

computer-readable program code that cross-checks a term entered by the user with a list of top favorite addressees, determined by the system, and issues a warning, if the probability is high that the user-entered term is faulty.

* * * * *

UNITED STATES PATENT AND TRADEMARK OFFICE
CERTIFICATE OF CORRECTION

PATENT NO. : 7,660,855 B2
APPLICATION NO. : 10/670638
DATED : February 9, 2010
INVENTOR(S) : Arning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1812 days.

Signed and Sealed this

Thirtieth Day of November, 2010

David J. Kappos
*Director of the United States Patent and Trademark Office*